United States Patent
Goldberg

(10) Patent No.: US 7,311,063 B2
(45) Date of Patent: Dec. 25, 2007

(54) AUTOMOTIVE SAFETY HARNESS FOR PETS

(75) Inventor: Carl L. Goldberg, Boulder, CO (US)

(73) Assignee: Ruff Rider, Inc., Boulder, CO (US)

(*) Notice: Subject to any disclaimer, the term of this patent is extended or adjusted under 35 U.S.C. 154(b) by 195 days.

(21) Appl. No.: 11/124,576

(22) Filed: May 9, 2005

(65) Prior Publication Data

US 2006/0249097 A1 Nov. 9, 2006

(51) Int. Cl.
*A01K 27/00* (2006.01)
(52) U.S. Cl. .................. 119/771; 119/792; 119/863
(58) Field of Classification Search ............. 119/771, 119/709, 770, 792, 793, 863
See application file for complete search history.

(56) References Cited

U.S. PATENT DOCUMENTS

| | | | |
|---|---|---|---|
| 1,800,421 A | 4/1931 | Wickersham et al. |
| 2,187,021 A | 1/1940 | Everson |
| 2,605,744 A | 8/1952 | Urbanski |
| 2,826,172 A | 3/1958 | Buckle et al. |
| 3,310,034 A | 3/1967 | Dishart |
| 3,948,222 A | 4/1976 | Longshore et al. |
| 4,402,669 A * | 9/1983 | Frazier ................ 433/5 |
| 4,512,286 A | 4/1985 | Rux |
| 4,655,172 A | 4/1987 | King |
| 4,676,198 A | 6/1987 | Murray |
| 4,715,618 A | 12/1987 | Harris |
| 4,896,630 A | 1/1990 | Luce |
| 4,907,541 A | 3/1990 | Thompson |
| 4,970,991 A | 11/1990 | Luce |
| 5,035,203 A | 7/1991 | Cardenas |
| 5,154,660 A | 10/1992 | Snyder et al. |
| 5,167,203 A | 12/1992 | Scott et al. |
| 5,335,627 A | 8/1994 | Bandimere |
| 5,359,964 A | 11/1994 | Sporn |
| 5,427,061 A | 6/1995 | McCullough |
| 5,443,037 A | 8/1995 | Saleme |
| 5,511,515 A | 4/1996 | Brown et al. |
| 5,676,093 A | 10/1997 | Sporn |
| 5,743,216 A | 4/1998 | Holt, Jr. |
| 5,794,571 A | 8/1998 | Goldberg |
| 5,893,339 A | 4/1999 | Liu |
| 5,915,335 A * | 6/1999 | Holt, Jr. ................ 119/771 |
| 6,101,979 A * | 8/2000 | Wilson et al. ........... 119/725 |
| 6,161,505 A | 12/2000 | Noguero |

(Continued)

*Primary Examiner*—Yvonne R. Abbott
(74) *Attorney, Agent, or Firm*—Harold A. Burdick

(57) ABSTRACT

An automotive safety harness for pets is disclosed, the harness including first and second closed loops formed by a length of webbing joined at opposite ends and secured at an intersection. The opposite ends at the second closed loop are permanently secured with the first closed loop at a position opposite the first closed loop from the intersection, a first fastener secured to an exterior surface at the position. A securing webbing is configured with first and second interface loops to slidably maintain the first and second closed loops at the position at one interface loop and receive the vehicle seat belt in the other, respectively. A second fastener is secured to the interior of the first interface loop surface, the first and second fasteners releasably engagable. A strap is connected to associate opposite sides of the second closed loop and includes a stretchable material portion for automatically refining fit of the second closed loop at the pet's torso without user intervention during and after harness mounting.

17 Claims, 3 Drawing Sheets

U.S. PATENT DOCUMENTS 6,427,635 B1 * 8/2002 Ballard .................. 119/771
6,450,130 B1 * 9/2002 Goldberg ................ 119/792

2007/0023231 A1 * 2/2007 Gorman et al. ............. 182/3

* cited by examiner

AUTOMOTIVE SAFETY HARNESS FOR PETS

FIELD OF THE INVENTION

This invention relates to pet restraints, and, more particularly, relates to pet safety harnesses for use with vehicle seat belt systems.

BACKGROUND OF THE INVENTION

A wide variety of restraints for pets have been heretofore suggested and or utilized. Some such restraints have been adapted for use in vehicles (in some cases in conjunction with the existing seat belt restraints in the vehicle) to restrain the pet in case of accident or the like (see, for example, U.S. Pat. Nos. 6,450,130, 5,915,335, 5,794,571, 5,443,037, 5,167,203, 5,154,660, 5,035,203, 4,970,991, 4,907,451, 4,896,630, 4,715,618, 4,676,198, 4,512,286, 3,948,222, 3,310,034). Others are adapted for use with leashes or tethers, or for use as general wear harnesses in particular applications (see, for example, U.S. Pat. Nos. 6,161,505, 5,893,339, 5,743,216, 5,676,093, 5,511,515, 5,427,061, 5,359,964, 5,335,627, 4,655,172, 2,826,172, 2,605,744, 2,187,021, and 1,800,421).

Such heretofore known and/or utilized pet restraints and harnesses have not, however, entirely resolved satisfactorily the safety issues arising when carrying an animal in a vehicle. The problem here is two fold: human driver and passenger safety is compromised when riding with an animal because during an accident the animal, if unrestrained or inadequately restrained, becomes a projectile (a rather large and heavy one in the case of some canines); and animal safety is compromised in an accident when the animal is unrestrained or inadequately restrained.

Some heretofore known restraints have done little more than anchor the animal's leash in the vehicle. In such cases, the animal is still able to be thrown significant distances within the vehicle's cab in case of accident. Other, more considered, approaches have suggested restraint systems that better limit animal movement in the cab, but testing suggests that various design shortcomings and/or weaknesses in construction can result in failure of the restraint in critical circumstances. In particular, the use of multiple attachment sites between tethers and harnesses used in such restraints, or other inadequate interconnection thereof, increase the possibility of interconnection failure during an accident. In other cases, overly difficult systems of attachment of harnesses, tethers, and auto seat belt systems discourage animal owner use of such systems on a regular basis.

Moreover, as with humans, ongoing accurate fit of the restraint on the animal is required to maximize animal security during an accident. Heretofore, this problem has been addressed, if at all, by addition of cumbersome mechanisms requiring significant and frequent user adjustment and readjustment, thereby increasing the likelihood that such adjustments will not be made and adding to the expense of such restraints. Finally, a perception by both the user and the animal of discomfort of some restraints when applied may be at least in part to blame for a lack of acceptance in the field of pet vehicle safety belt harnesses. Further improvements could thus still be utilized.

SUMMARY OF THE INVENTION

This invention provides a multiuse automotive safety harness for restraint of pets riding in vehicles (utilizing the safety belts found in most modern motor vehicles) that enhances driver, passenger and animal safety in case of accident. The harness employs an improved seat belt interconnection attachment that significantly enhances the adequacy of animal restraint during accidents and reduces the likelihood of attachment failure. The harness is simply mounted to the animal and attached in the vehicle thereby increasing its use. Accuracy of fit of the harness during use is automatically corrected thus enhancing animal security in case of accident.

The harness can also be used for leashing or tethering the animal, and can remain on the animal when running free without concern that apparatus appendages will flog the animal or that the apparatus will become dislodged from the animal and/or entangled as the animal moves about. The pet safety harness of this invention is relatively inexpensive to produce and is secure and comfortable on the animal. Materials, harness design and component securement are improved, particularly at key segments used in conjunction with the vehicle's safety belt system.

The harness includes first and second closed loops formed by a length of webbing joined at opposite ends and secured at an intersection (thereby defining the closed loops). The second closed loop, having the joined opposite ends thereat opposite the second closed loop from the intersection, is permanently secured at the first closed loop at a position opposite the first closed loop from the webbing intersection thereby defining third and fourth closed loops. A fastener element is provided at an exterior surface of the position of securement.

A securement is formed of a length of material joined at opposite ends to form a tethering loop at one terminus, and intermediately joined to form a receiving loop at an opposite terminus and at least one vehicle seat belt securing loop between the tethering loop and the receiving loop. The receiving loop slidably maintains the first and second closed loops therethrough at the securement position. Another fastener element is secured to an interior receiving loop surface, the first and second fastener elements being releasably engagable. A vehicle seat belt is receivable through the securing loop. The tethering loop and the receiving loop of the securement each have a fastening member secured at a surface thereof, the fastening members being releasably engagable to secure the end of the securement.

A strap is connected at the second closed loop spaced from the intersection for associating opposite sides of the second closed loop. The strap includes a mechanism for automatically refining fit of the second closed loop at the pet's torso without user intervention during or after mounting. The mechanism includes a substantially nonstretchable strap segment and a stretchable material portion having an unstretched length between first and second ends thereof. The stretchable material portion is secured at the first and second ends thereof to first and second attachment locales, respectively, of the nonstretchable strap segment. The locales define a length of the nonstretchable strap segment therebetween, with the length of the nonstretchable strap segment between the locales being greater than the unstretched length between the ends of the stretchable material portion.

It is therefore an object of this invention to provide an improved automotive safety harness for pets.

It is another object of this invention to provide an automotive safety harness for restraint of pets riding in vehicles that enhances driver, passenger and animal safety in case of accident.

It is still another object of this invention to provide an automotive safety harness for pets employing improved seat belt interconnection attachment significantly enhancing the adequacy of animal restraint during accidents.

It is yet another object of this invention to provide an automotive safety harness for pets that is simple to mount on the animal and attach in the vehicle.

It is another object of this invention to provide an automotive safety harness for pets wherein accuracy of fit of the harness during harness is automatically corrected.

It is yet another object of this invention to provide an improved multiuse automotive safety harness for pets that can also be used for leashing or tethering the animal, and can remain on the animal when running free without animal welfare concerns.

It is still another object of this invention to provide an improved automotive safety harness for pets that is inexpensively produced and is secure and comfortable on the animal.

It is still another object of this invention to provide an automotive safety harness mountable on a pet and engageable at a vehicle seat belt, the harness including first and second closed loops formed by a length of webbing joined at opposite ends and secured at a webbing intersection thereby defining the closed loops each extending from the webbing intersection, the second closed loop having the joined opposite ends opposite the second closed loop from the webbing intersection, the opposite ends permanently secured at the first closed loop at a position opposite the first closed loop from the webbing intersection thereby defining third and fourth closed loops, the position provided with a first fastener element secured to an exterior surface thereat, and a securement formed of a length of webbing joined at opposite ends and intermediately joined to form a receiving loop slidably maintaining the first and second closed loops therethrough at the position and having a second fastener element secured to an interior receiving loop surface thereat, the first and second fastener elements releasably engagable, the securement having at least one vehicle seat belt securing loop adjacent to the receiving loop adapted for receiving the vehicle seat belt therethrough.

It is yet another object of this invention to provide an automotive safety harness mountable on a pet by a user and engageable at a vehicle seat belt, the harness including first and second closed loops formed by a length of webbing joined at opposite ends and secured at a webbing intersection thereby defining the closed loops each extending from the webbing intersection, the second closed loop having the joined opposite ends opposite the second closed loop from the webbing intersection, the opposite ends permanently secured at the first closed loop at a position opposite the first closed loop from the webbing intersection, a strap connected at the second closed loop spaced from the webbing intersection for associating opposite sides of the second closed loop and including means for automatically refining fit of the second closed loop at the pet's torso without user intervention during or after mounting, and a securement configured to retain the first and second closed loops at the position and including at least one vehicle seat belt attachment adapted for receiving the vehicle seat belt.

It is yet another object of this invention to provide an automotive safety harness mountable on a pet and engageable at a vehicle seat belt, the harness including first and second closed loops formed by a length of material joined at opposite ends and secured at a material intersection thereby defining the closed loops, the second closed loop having the joined opposite ends opposite the second closed loop from the material intersection, the opposite ends permanently secured at the first closed loop at a position opposite the first closed loop from the material intersection, a strap connected at the second closed loop spaced from the material intersection, the strap adapted for automatically refining fit of the second closed loop at the pet's torso during harness use, and a securement formed of a length of material joined at opposite ends to form a tethering loop at one terminus and intermediately joined to form a receiving loop at an opposite terminus and at least one vehicle seat belt securing loop between the tethering loop and the receiving loop, the receiving loop slidably maintaining the first and second closed loops therethrough at the position and the securing loop adapted for receiving the vehicle seat belt therethrough, the tethering loop and the receiving loop of the securement each have a fastening member secured at a surface thereof, the fastening members releasably engagable.

With these and other objects in view, which will become apparent to one skilled in the art as the description proceeds, this invention resides in the novel construction, combination and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
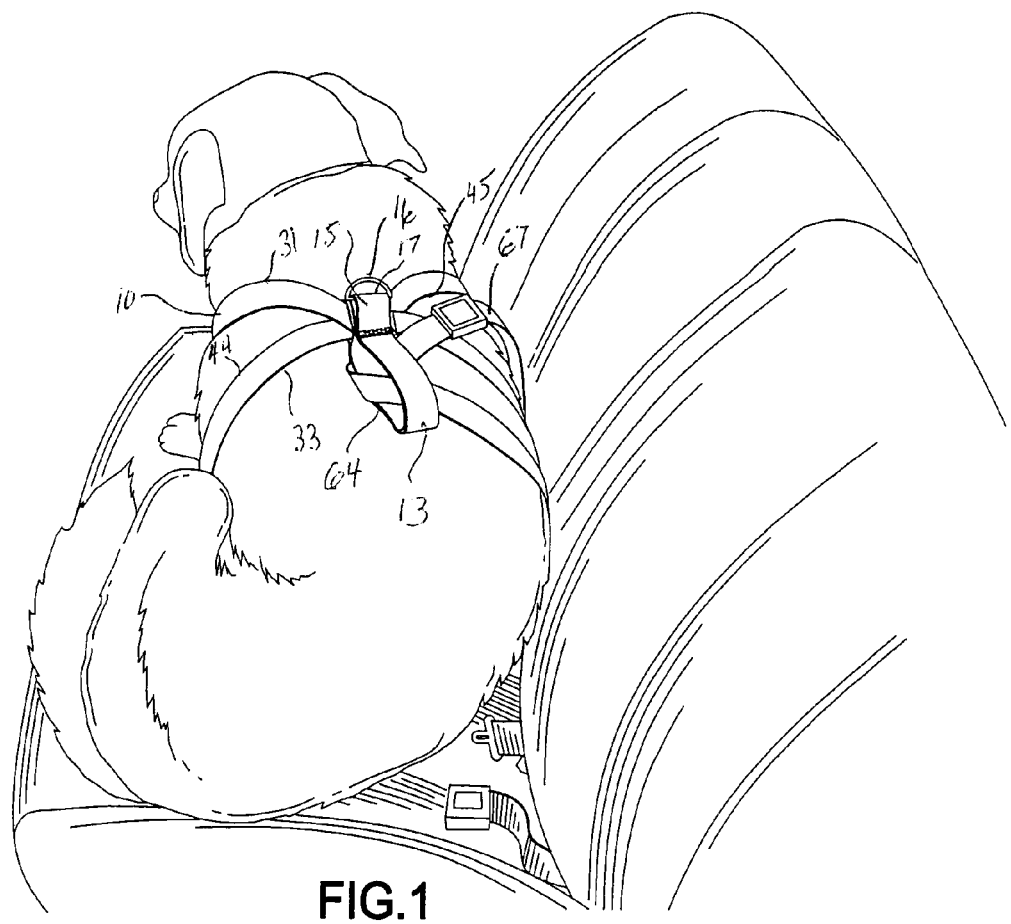
FIG. 1 is a perspective view illustration of the safety harness of this invention in use securing a pet in a vehicle.

The multiuse automotive safety harness for pets of this invention is illustrated in FIGS. 1 through 6B. Harness 10 includes harness body 11 and multiloop securing band 13 having tethering loop 15 with leash or tether line attachment locus 16 (a d-ring, for example) at the free end terminus 17 thereof. Automatically adaptable torso strap set 18 includes first and second straps 19 and 21 and nylon or carbon plastic connecting buckle assembly 23 having buckle body 24 permanently attached at strap 19 and adjustably receiving strap 21 through slots in buckle insert 26 (see FIG. 6A), as is known for webbing securements.

Harness body 11 and securing band 13 are each formed of a single length of webbing (preferably 1.75" mil spec type 7, class 2, nylon webbing having 6,000 to 10,000 pound load bearing strength). The single length of webbing forming harness body 11 is joined at its opposite ends (as discussed hereinafter) at position 28 to form an endless belt. The endless belt is joined at an intermediate position (by overlapping the webbing thereat in a figure-eight-type arrangement) and secured at a selected engagement angle at intersection 29 to form first and second closed loops 31 and 33.

Figure 5:
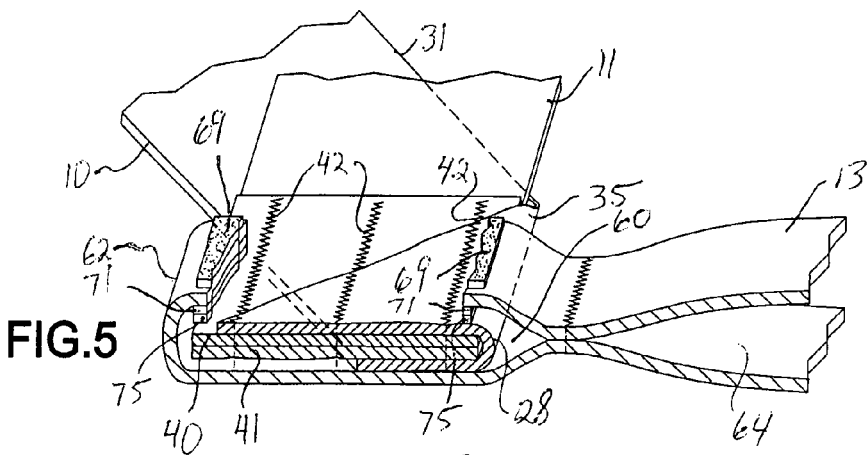
FIG. 5 is a sectional view taken through section lines 5-5 of FIG. 4.

This webbing material has folds 35, 37 and 39 formed and secured therein to shape the harness by angularly redirecting the webbing at the folds. As shown in FIG. 5, fold 35 at loop 31 captures ends 40 and 41 of the webbing therein, the entire assembly then being secured by multiple bar tacks 42 significantly enhancing harness strength. By thus securing loop 31 and loop 33 (at locations opposite the respective loops from intersection 29) additional loops 44 and 45 are defined. As shown in FIG. 1, loop 31 is received over the animal's head and around the neck/breast area, loop 33 is received behind the animal's forelegs and across and around the animal's torso, and loops 44 and 45 each receive one of the animal's forelegs.

Figure 6A:
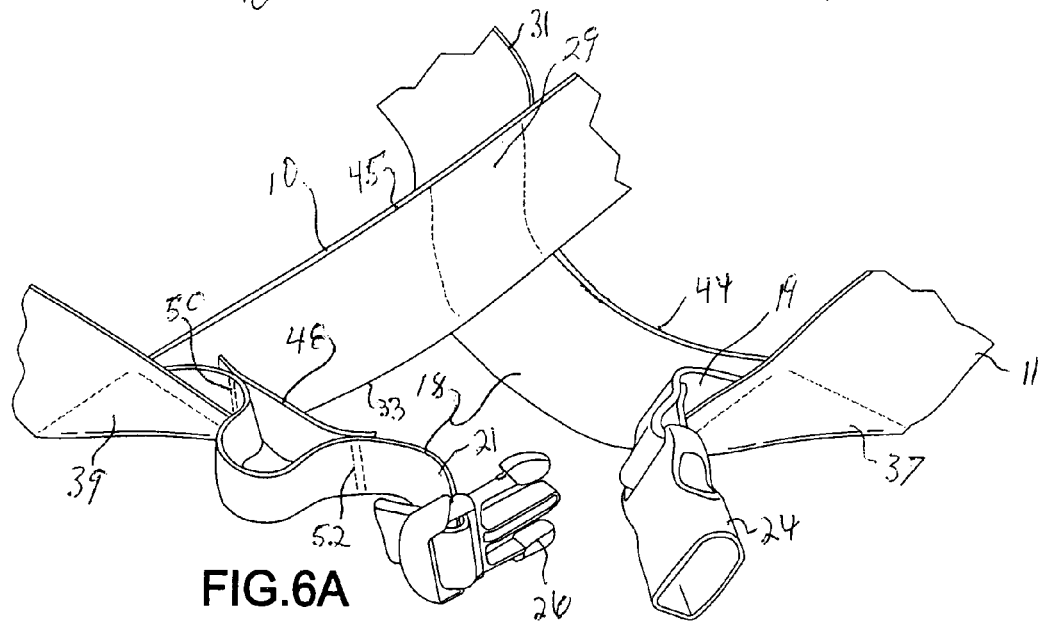
FIGS. 6A and 6B are detail illustrations showing the mechanism by which accuracy of fit of the harness during harness use is automatically corrected.
Figure 6B:
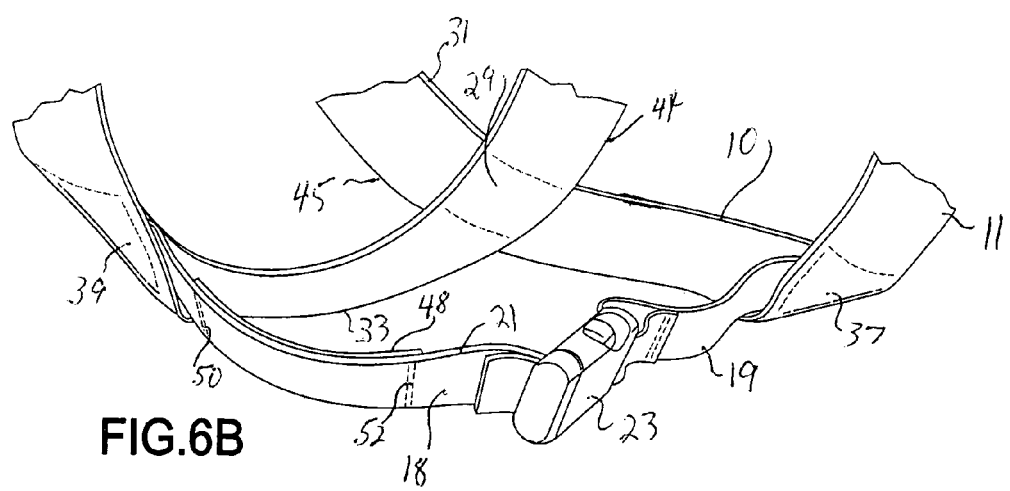

Torso strap set 18 is provided for associating opposite sides of closed loop 33, thus providing loop security and adjustable fit at the animal's torso. Strap 21 is connected with harness body 11 internal of fold 39, and strap 19 is likewise connected with harness body 11 internal of fold 37 (i.e., the straps are secured within the folds when the folds are secured). Strap set 18 is configured for automatic refinement of fit of closed loop 33 at the animal's torso without user intervention at or after the time of mounting. The mechanism for accomplishing fit refinement includes a length of stretchable material 48 (elastic fabric, rubber or the like) secured at its ends to a length of strap 21 between attachment locales 50 and 52 (see FIGS. 6A and 6B). The length of strap 21 between locales 50 and 52 is greater than the length of material 48 between it ends (in the unstretched state, as shown in FIG. 6A), thus gathering strap 21 when unstretched and allowing the gather to relax for different torso expansions realized by the animal due to breathing and/or change of position during harness use (as shown in FIG. 6B). This constant refinement of fit improves safety for the animal, much the same as the tensioning system in the standard seat belt system operates to better secure a human passenger.

Figure 2:
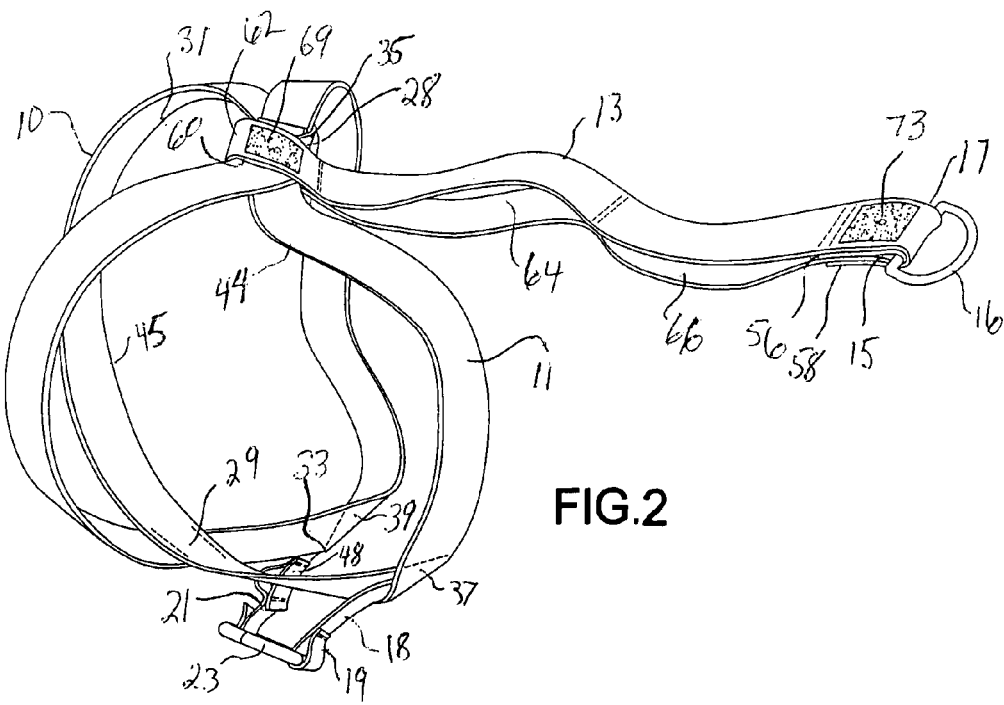
FIG. 2 is a perspective view of the safety harness shown in FIG. 1.
Figure 3:
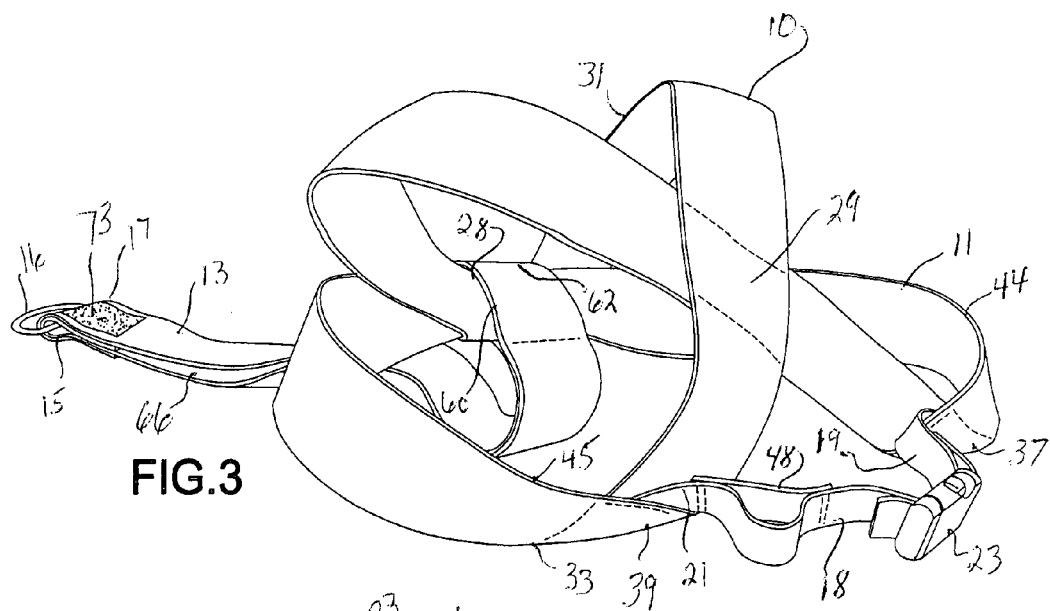
FIG. 3 is another perspective view of the safety harness shown in FIGS. 1 and 2.
Figure 4:
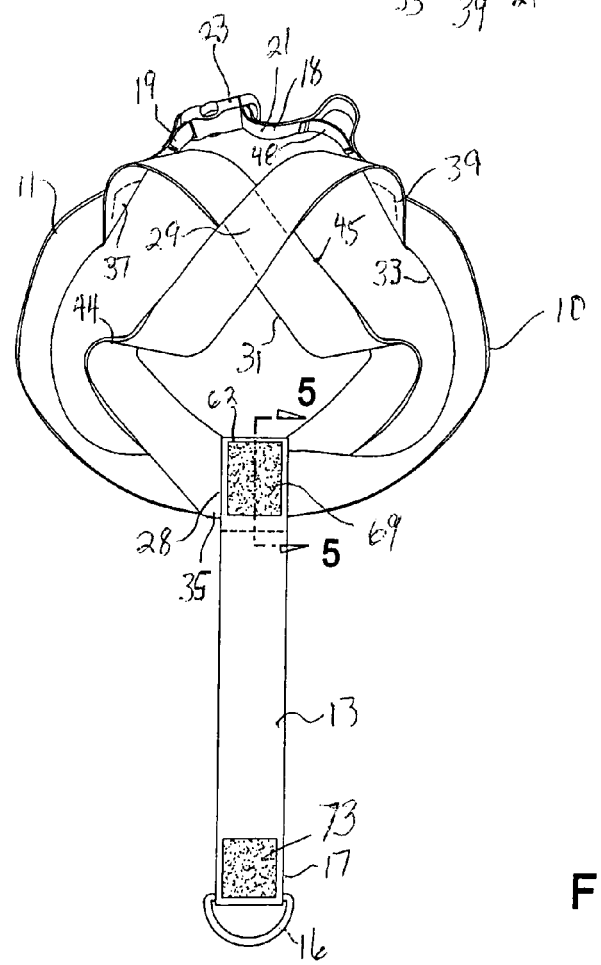
FIG. 4 is another view of the safety harness shown in FIGS. 1 through 3.

Multiloop securing band 13 is formed to be maintained in the area of position 28 of harness body 11 by securing ends 56 and 58 thereof together in a fashion that at the same time forms tethering loop 15 and secures d-ring 16 (using multiple bar tack for example, as shown in FIG. 2). Intermediate bar tacks form receiving loop 60 at opposite terminus 62 thereof and first and second seat belt securing loops 64 and 66 (a single seat belt loop could be utilized) for receipt of the auto seat belt (seat belt 67 in FIG. 1).

As shown in FIG. 5, receiving loop 60 includes fasteners 69 and 71 secured (sewn, for example) to outer and interior surfaces, respectively, thereof (central portions of the fasteners are cut away in the FIGURE to better show the webbing). Matable fasteners 73 and 75 are secured to the outer surfaces of tethering loop 15 and at position 28 (at fold 35), respectively (again, the central portion of fastener 75 is cut away in the FIGURE). The engagement of fasteners 71 and 75 provide for lateral securement of harness body 11 relative to securing band 13, and has proven better able to resist sheer forces than standard stitching. By engaging of fasteners 69 and 73, the loose end terminus 17 of securing band 13 is secured, particularly desirable when the animal is running free and band 13 and d-ring 16 might otherwise be likely to painfully strike the animal. Any type of known fasteners could be utilized herein, though VELCRO type hook and loop fabric fasteners are preferred.

Securing loop 64 preferably extends from receiving loop 60 a distance no more than about three times (preferably 2.5 to 3 times) the width of the webbing of harness body 11 thereat. In this way, when engaged by a seat belt, travel of the animal thus secured is significantly limited during an accident or sudden stop thereby better protecting the animal and others in the vehicle (for example, front seat passengers if the pet is secured in a rear seat).

In use, harness body 11 is applied to the animal as discussed above and shown in FIG. 1. Strap set 18 is buckled and tightened to a secure but comfortable fit. In a vehicle, the vehicle seat belt (lap belt or a shoulder/lap belt combination 67) is laced through securing loop 64 (or 66) of securing band 13, and tethering loop fastener 69 is brought into contact with fastener 73 at receiving loop 60 to secure end 17. Fasteners 71 and 75 should be checked for proper alignment, and if necessary released, repositioned and reengaged.

When not secured in the vehicle, d-ring 16 may be used to tether the animal wearing harness 10 or for application of a leash. When the animal is in no way tethered or leashed (i.e., free running), tethering loop fastener 69 is brought into contact with receiving loop fastener 73 to assure that securing band 13 or d-ring 16 doesn't snag, strike or otherwise injure the animal as the animal moves about.

The harness of this invention is constructed by first providing a single length of webbing selected for a particular size category. At approximately the midspan of the length of webbing, the webbing is folded over to form fold 35. Using a 1.75" webbing, for example, the fold is formed along a span selected to accommodate the interface angle of the overlapped webbing a intersection 29 as set forth hereinafter.

The webbing is lapped over itself at an intermediate position (a selected length on each opposite sided from fold 35) and secured at intersection 29 thereat to thereby form closed loop 31. Each side of the webbing extending from intersection 29 has a fold formed therein, folds 37 and 39 being secured with straps 19 and 21, respectively, therein. Folds 37 and 39 redirect the webbing thereat and are formed along a span selected for proper position of the harness when fitted to an animal in the particular size category. Ends 40 and 41 of the webbing are then overlapped (about 2") and secured internally of fold 35 as discussed above thus forming closed loop 33 of harness body 11, as well as loops 44 and 45. All securements should be sturdy and in keeping with current standards for seat belt construction.

The overlap at intersection 29 is preferably at an intersection angle so that each of the closed loops 31 and 33 is characterized by an angular webbing angel at the intersection of less than 90°. It has been found that an angle of between about 25° and 75° is preferred (more preferably between about 30° and 50°).

Materials and connections discussed above should be calculated to provide in excess of about 5,000 pounds of load at all points along the webbing (and preferably about 6,000 pounds or more) so that, in use, accident forces can be predictably resisted. If stitching is utilized at least in part for the various connections, fold securements and the like, 69 to 92 weight nylon thread and, particularly at potentially high stress connections at harness body 11 and securing band 13, multiple stitch bars, horizontal and/or vertical, should be utilized. Nylon webbing material used in the harness is preferably about a 5,000 pound, or greater, test material. Reflective cloth tape may be applied and secured at all or selected portions of the outward surfaces of closed loops 31 and 33 to provide greater night visibility.

As may be appreciated from the foregoing, an improved and highly versatile automotive safety harness for use with vehicular seat belt systems is provided that enhances safety and security of an animal while riding in a vehicle. The harness is provided with stronger interconnections, is simple to mount to a pet and install in the vehicle, and provides for refinement (tensioning) of harness fit on the animal during use.

What is claimed is:

1. An automotive safety harness mountable on a pet by a user and engageable at a vehicle seat belt, said harness comprising:

first and second closed loops formed by a length of webbing joined at opposite ends and secured at a webbing intersection thereby defining said closed loops each extending from said webbing intersection, said second closed loop having said joined opposite ends opposite said second closed loop from said webbing intersection, said opposite ends permanently secured at said first closed loop at a position opposite said first closed loop from said webbing intersection, said second closed loop including first, second and third permanently secured folds formed in said webbing, one each of said first and second folds located at opposite sides of said second closed loop and spaced from said webbing intersection, said third permanently secured fold formed in said webbing at said first closed loop at said position, said third fold receiving therein and securing said opposite ends of said webbing;

a strap connected at said second closed loop spaced from said webbing intersection for associating opposite sides of said second closed loop and including means for automatically refining fit of said second closed loop at the pet's torso without user intervention during and after mounting, said first and second folds of said second closed loop each receiving and securing therein a different end of said strap; and a securement configured to retain said first and second closed loops at said position and including at least one vehicle seat belt attachment adapted for receiving the vehicle seat belt.

2. The automotive safety harness of claim 1 wherein third and fourth closed loops are defined by securement of said opposite ends at said position of said first closed loop, said position provided with a first fastener element secured to an exterior surface thereat.

3. The automotive safety harness of claim 2 wherein said securement is formed of a length of webbing joined at opposite ends and intermediately joined to form a receiving loop slidably maintaining said first and second closed loops therethrough at said position and having a second fastener element secured to an interior receiving loop surface thereat, said first and second fastener elements releasably engagable, said attachment of said securement having at least one vehicle seat belt securing loop adjacent to said receiving loop adapted for receiving the vehicle seat belt therethrough.

4. The automotive safety harness of claim 3 wherein said opposite ends of said webbing of said securement are joined to form a tethering loop retaining a tethering ring therein.

5. The automotive safety harness of claim 4 wherein said tethering loop and said receiving loop of said securement each have a fastening member secured at a surface thereof, said fastening members releasably engagable.

6. The automotive safety harness of claim 1 wherein said strap includes first and second releasable strap segments.

7. The automotive safety harness of claim 1 wherein said means for automatically refining fit of said strap includes a substantially nonstretchable strap segment and a stretchable material portion having an unstretched first length between first and second ends thereof, said stretchable material portion secured at said first and second ends thereof to first and second attachment locales, respectively, of said nonstretchable strap segment, said locales defining a length of said nonstretchable strap segment therebetween, said length of said nonstretchable strap segment between said locales being greater than said first length between said ends of said stretchable material portion.

8. An automotive safety harness mountable on a pet by a user and engageable at a vehicle seat belt, said harness comprising:

first and second closed loops formed by a length of webbing joined at opposite ends and secured at a webbing intersection thereby defining said closed loops each extending from said webbing intersection, said second closed loop having said joined opposite ends opposite said second closed loop from said webbing intersection, said opposite ends permanently secured at said first closed loop at a position opposite said first closed loop from said webbing intersection, said second closed loop including first, second and third permanently secured folds formed in said webbing, one each of said first and second folds located at opposite sides of said second closed loop and spaced from said webbing intersection, said third permanently secured fold formed in said webbing at said first closed loop at said position, said third fold receiving therein said opposite ends of said webbing, said opposite ends secured and joined, and said position thereby established, by multiple bar tacks through said third fold and said opposite ends;

a strap connected at said second closed loop spaced from said webbing intersection for associating opposite sides of said second closed loop and including means for automatically refining fit of said second closed loop at the pet's torso without user intervention during and after mounting, said first and second folds of said second closed loop each receiving and securing therein a different end of said strap; and a securement configured to retain said first and second closed loops at said position and including at least one vehicle seat belt attachment adapted for receiving the vehicle seat belt.

9. The automotive safety harness of claim 8 wherein said strap includes first and second releasably engageable strap segments, at least said first strap segment made of substantially nonstretchable material, said means for automatically refining fit including a stretchable material portion having an unstretched first length between first and second ends thereof secured at said first and second ends to first and second attachment locales, respectively, of said first strap segment, said locales defining a length of said first strap segment therebetween, said length of said first strap segment between said locales being greater than said first length between said ends of said stretchable material portion.

10. The automotive safety harness of claim 8 wherein said securement is formed of a length of webbing joined at opposite ends and intermediately joined to form a receiving loop for slidably maintaining said first and second closed loops therethrough at said position.

11. The automotive safety harness of claim 10 wherein said position has a first fastener element secured to an exterior surface thereat, and wherein said securement has a second fastener element secured to an interior receiving loop surface thereat, said first and second fastener elements releasably engagable.

12. The automotive safety harness of claim 11 wherein said seat belt attachment of said securement has at least one vehicle seat belt securing loop adjacent to said receiving loop adapted for receiving the vehicle seat belt therethrough.

13. An automotive safety harness mountable on a pet and engageable at a vehicle seat belt, said harness comprising:
   first and second closed loops formed by a length of material joined at opposite ends and secured at a material intersection thereby defining said closed loops, said second closed loop having said joined opposite ends opposite said second closed loop from said material intersection, said opposite ends permanently secured at said first closed loop at a position opposite said first closed loop from said material intersection, said position having a first fastener element secured at an exterior surface thereat;
   a strap connected at said second closed loop spaced from said material intersection, said strap adapted for automatically refining fit of said second closed loop at the pet's torso during harness use; and
   a securement formed of a length of material joined at opposite ends to form a tethering loop at one terminus and intermediately joined to form a receiving loop at an opposite terminus and at least one vehicle seat belt securing loop between said tethering loop and said receiving loop, said receiving loop slidably maintaining said first and second closed loops therethrough at said position and said securing loop adapted for receiving the vehicle seat belt therethrough, said tethering loop and said receiving loop of said securement each have a fastening member secured at a surface thereof, said fastening members releasably engagable, said receiving loop of said securement having a second fastener element secured to an interior receiving loop surface thereat, said first and second fastener elements releasably engagable, wherein said fastener elements and said fastening members are fabric hook and loop type fasteners sewn to their respective surfaces.

14. The automotive safety harness of claim 13 wherein said tethering loop retains a tethering ring therein.

15. The automotive safety harness of claim 13 wherein said strap includes a substantially nonstretchable strap segment and a stretchable material portion having an unstretched first length between first and second ends thereof, said stretchable material portion secured at said first and second ends thereof to first and second attachment locales, respectively, of said nonstretchable strap segment.

16. The automotive safety harness of claim 15 wherein said attachment locales of said nonstretchable strap segment define a length of said nonstretchable strap segment therebetween, said length of said nonstretchable strap segment between said locales being greater than said first length between said ends of said stretchable material portion.

17. The automotive safety harness of claim 13 wherein a webbing redirecting fold is formed at said first closed loop at said position, said fold receiving and securing therein said opposite ends of said webbing forming said first and second closed loops.

* * * * *